3,697,435
Patented Oct. 10, 1972

3,697,435
URANIUM DIOXIDE-YTTRIUM OXIDE-ZIRCONIUM DIOXIDE MICROSPHERES
Jean G. Smith, Baltimore, Md., and Frederick T. Fitch, Shaker Heights, Ohio, assignors to W. R. Grace & Co., New York, N.Y.
No Drawing. Continuation-in-part of application Ser. No. 495,352, Oct. 17, 1965. This application Mar. 16, 1967, Ser. No. 623,554
Int. Cl. C09k 3/00; G21c 19/42
U.S. Cl. 252—301.1         1 Claim

ABSTRACT OF THE DISCLOSURE

Microspheres containing 30–55% uranium dioxide, 10–45% yttrium oxide, and 15–55% zirconium dioxide.

---

This application is a continuation-in-part of application Ser. No. 495,352, filed Oct. 17, 1965, now U.S. Pat. 3,355,525.

This invention relates to a product which comprises highly uniform uranium dioxide-yttrium oxide-zirconium dioxide microspheres.

In summary, the product of this invention consists of microspheres of metal oxides produced by a method that comprises mixing an ammonia-releasing agent with a member selected from the group consisting of an aqueous solution of soluble salts of $U^{+4}$, $Y^{+3}$, and $(ZrO)^{+2}$ and an aquasol of uranium dioxide-yttrium oxide-zirconium dioxide containing from 0 up to saturation quantities of dissolved salts of $U^{+4}$, $Y^{+3}$, and $(ZrO)^{+2}$, introducing the mixture in the form of droplets in a dehydrating solvent having a temperature sufficiently high to cause substantial decomposition of the ammonia releasing agent; and recovering partially dehydrated microspheres from the dehydrating solvent. The formation of microspheres having the composition, in terms of weight percents, of from 30 to 55 percent uranium dioxide, 10 to 45 percent yttrium oxide, and 15 to 55 percent zirconium dioxide is desired. It has been found that these values fall within the limits of mutual solubility as defined by the phase diagram for the uranium dioxide-yttrium oxide-zirconium dioxide system. The formation of microspheres having the composition, in terms of weight percents, of 45 percent uranium dioxide, 35.6 percent yttrium oxide, and 19.4 percent zirconium dioxide is of particular importance.

In summary, the compositions of this invention are microspheroidal uranium dioxide-yttrium oxide-zirconium dioxide particles having a size of from 50 to 400 microns and consisting essentially of from 30 to 55 weight percent uranium dioxide, 10 to 45 weight percent yttrium oxide, and 15 to 55 weight percent zirconium dioxide. Green spheres have densities within the range of from 15 to 60 percent of the theoretical density of the compositions. Sintered spheres have densities ranging up to about 99% of the theoretical density of the compositions.

Dense microspheres of actinide oxides in combination with other metal oxides in the size range of from 50 to 400 microns are important for manufacturing fuel elements for high temperature nuclear reactors of which the gas-cooled reactors are an example. Each microsphere consists of two parts, a core and a coating. The core is the portion containing the actinide oxide in solid solution with other oxides. The core must have good sphericity, strength, and high density. An impervious coating of a refractory metal oxide or pyrolytic carbon is applied to the core to insure fission product retention. The coated microspheres are then dispersed in a matrix material and fabricated into fuel elements.

It is an object of this invention to provide a process for making uranium dioxide-yttrium oxide-zirconium dioxide microspheres wherein the oxide components are in intimate mixture or solid solution.

It is another object of this invention to provide a process for making uranium dioxide-yttrium oxide-zirconium dioxide microspheres from uranium dioxide-yttrium oxide-zirconium dioxide aquasols, from uranium dioxide-yttrium oxide-zirconium dioxide aquasols containing dissolved salts of $U^{+4}$, $Y^{+3}$, and $(ZrO)^{+2}$, and from solutions of dissolved salts of $U^{+4}$, $Y^{+3}$, and $(ZrO)^{+2}$.

It is another object of this invention to provide a process for forming uranium dioxide-yttrium oxide-zirconium dioxide microspheres containing the oxide components in intimate mixture or solid solution, said microspheres having the composition, expressed as weight percents, of from 30 to 55 percent uranium dioxide, 10 to 45 percent yttrium oxide, and 15 to 55 percent zirconium dioxide, and to provide the product formed thereby.

In one embodiment of the process of this invention, microspheres containing uranium dioxide-yttrium oxide-zirconium dioxide are formed by the general technique of mixing an ammonia-releasing agent with an aquasol of the metal oxides, introducing the mixture in the form of droplets into a dehydrating solvent having a temperature which is sufficiently high to cause substantial ammonia release from the ammonia-releasing agent, and recovering from the dehydrating solvent microspheres which have undergone at least partial dehydration.

The metal oxide aquasols which are suitable for use as feed materials in this embodiment of the process of this invention have been previously disclosed. When aquasols which are substantially free from soluble metal salts are employed as the feed in the process of this invention, a high quality microsphere product is formed. Furthermore, this high quality product can be formed over a wide range of operating conditions.

The process of this invention is also suitable for forming the metal oxide microspheres from the metal oxide aquasols containing substantial portions of dissolved $U^{+4}$, $Y^{+3}$, and $(ZrO)^{+2}$. The anion portion of the salt can be any anion providing a water-soluble salt. Examples of these metal salts include the metal chlorides, bromides, nitrates, sulfates, formates, and acetates. Monovalent anions are preferred, but anions having higher valences can be used.

The concentration of the metal compounds in the aquasol feed can vary over a wide range. The total concentration of metal compounds in the aquasol feed, expressed as the metal oxides, can be within the range of from one to 500 grams per liter, and is preferably within the range of from about 50 to 150 grams per liter. The aquasols can contain from zero up to saturation quantities of the dissolved metal salts. An aquasol is defined as containing "saturation quantities" of soluble metal salts when the liquid phase is saturated with the soluble metal salts. Quantities of the dissolved metal salts greater than 0.1 gram per liter can be present in the aquasols. Preferably the dissolved metal salts are present in quantities which are insufficient to flocculate the sol particles, but flocculating quantities of the dissolved metal salts can be employed in the feed. A flocculated feed is somewhat harder to deliver to the column although it can still be handled. The term, metal oxide aquasols, is employed herein as including the metal oxide aquasols which contain dissolved metal salts in quantities sufficient to flocculate the sol particles in addition to the aquasols which contain no dissolved metal salts or less than flocculating quantities of dissolved metal salts. By varying the solution concentration and the size of the droplets in the dehydrating solvent, it is possible to obtain microspheres upon dehydration which have a wide range of sizes. The quantities of each of the uranium, yttrium, and zirconium compounds employed in the feed is such as to form microsphere products having the composition, in terms of weight percents, of from 30 to 55 percent uranium dioxide, 10 to 45 percent yttrium oxide, and 15 to 55 percent zirconium dioxide. Quantities of these components which yield the composition of 45 percent uranium dioxide, 35.6 percent yttrium oxide, and 19.4 percent zirconium dioxide are of particular interest. The term uranium dioxide is defined as including uranium oxides having oxygen contents ranging from 2.0 up to about 2.3 atoms of oxygen per atom of uranium. A major portion of the excess oxygen is believed to be interstitial and is removed from the product in later processing steps such as sintering.

The ammonia-releasing agents employed in the process of this invention are, in general, compounds which when heated above room temperature provide a substantial release of ammonia by thermal decomposition but which are relatively stable at ambient or room temperatures. Because of their low rate of reaction and ammonia release at ambient temperatures, these compounds can be added to the metal oxide aquasols at room temperature without causing an immediate reaction. When the aquasol droplets are heated by contact with the dehydration solvent, these compounds decompose rapidly to release ammonia. The ammonia reacts with the metal compounds present in the aquasols to form a metal oxide gel within the droplets. Examples of suitable ammonia-releasing agents are hexamethylenetetramine, acetamide, ammonium carbamate, ammonium cyanate, urea, and mixtures thereof. The ammonia-releasing agent is preferably added to the aquasol just prior to the introduction of the feed materials into the dehydrating solvent. However, the ammonia-releasing agent can be mixed with the aquasol feed several hours before use if the mixture is maintained at a low temperature until just prior to use.

The quantity of ammonia-releasing agent mixed with the aquasol feeds is sufficient to form a metal oxide gel from the metal compounds present in the sol droplets when they are contacted with the dehydrating solvent. Metal oxide aquasols which are substantially free from dissolved metal salts can be mixed with a quantity of the ammonia-releasing agent sufficient to adjust the pH of the feed to from 1.0 to 0.1 and preferably from about 0.8 to 0.4 pH units below the gelation pH of the sol. The gelation pH of an aquasol feed is defined as the pH which will effect gelation of the sol within 15 minutes after the adjustment of the sol to this pH is made. When the aquasol feed contains substantial quantities of the dissolved metal salts, the quantity of ammonia-releasing agent employed is sufficient to provide from 70 to 300 percent and preferably from 100 to 150 percent of the stoichiometric quantity of ammonia required to precipitate the metal salts in the feed.

In another embodiment of the process of this invention, microspheres containing these oxides are formed by the general technique of mixing an ammonia-releasing agent with an aqueous solution containing salts of the $U^{+4}$, $Y^{+3}$, and $(ZrO)^{+2}$, introducing the mixture in the form of droplets into a dehydrating solvent having a temperature which is sufficiently high to cause substantial ammonia release from the ammonia-releasing agent, and recovering microspheres from the dehydrating solvent which have undergone at least partial dehydration. The anion portion of the salt can be any anion providing a water-soluble salt. Examples of the metal salts include the metal chlorides, bromides, nitrates, sulfates, formates, and acetates.

The concentration of the metal salts in the aqueous solution can vary from one g./l., expressed as the respective metal oxides up to the saturation concentration of the solution. Preferably, the concentration should be from about 50 to 150 g./l., expressed as the oxides. By varying the solution concentration and the size of the droplets introduced into the dehydrating solvent, it is possible to obtain microspheres upon dehydration which have a wide range of sizes.

The ammonia-releasing agents employed in this embodiment of the process of this invention are the same as previously described. The amount of ammonia-releasing agent which is incorporated into the metal salt solution can be a quantity sufficient to provide from about 70 percent of stoichiometric quantity of ammonia required to precipitate the metal salts up to 200 percent of an excess of the stoichiometric quantity. The preferred amount of ammonia releasing agent is from the stoichiometric quantity up to 50 percent in excess thereof. The ammonia-releasing agent may be added as a solid to the metal salt solution or it may first be dissolved in water and then added in a solution form. It is desirable to stir the metal salt solution when the ammonia-releasing agent is added in order to prevent localized concentrations of the ammonia-releasing agent in the metal salt solution and premature precipitation, which may result therefrom.

The microspheres are formed from the mixture of the ammonia-releasing agent and the metal oxide aquasols, metal oxide aquasol-metal salt solution, or metal salt solution using a hot solvent column system such as disclosed in applications Ser. No. 364,930 filed May 5, 1964 and now U.S. Pat. No. 3,380,894 and Ser. No. 364,931 filed May 5, 1964 and now U.S. Pat. No. 3,340,567. In this system, the solution or sol droplets which constitute the feed are introduced into the top of a counter-currently flowing stream of hot dehydrating solvent passing up through a tall column. The hot solvent heats the droplets and effects decomposition of the ammonia-releasing agent, and the released ammonia reacts with the metal oxide sol particles and/or the metal salts to precipitate and gel the corresponding oxides in the aqueous droplet. As the droplets fall through the column, they are dehydrated, and the dehydrated microspheres are collected from the bottom of the column. The microspheres are continuously removed, separated from the solvent, and are further dried before sintering.

The hot column solvent apparatus comprises a tall column with a conical bottom wherein the microspheres settle. The dehydrating solvent is introduced into the bottom of the column and is removed at the top thereof. The feed can be introduced into the top of the column to form solution droplets by several techniques. For example, a small tube or needle having an inner diameter within the range of from 0.15 to 0.6 millimeter can be used to introduce the feed into the solvent to produce the preferred particles. Preferably the needle is surrounded by a larger capillary tube through which solvent is passed, and the suspension is introduced concurrently with this stream of solvent. As an alternate technique, the feed can be dispersed in a suitable solvent to form an emulsion containing droplets having uniform size, and the emulsion can be introduced into the column through an appropriate inlet. The dehydrated microspheres are removed from the conical collecting section at the bottom of the column.

In the hot column technique, the solvent can be reconditioned by circulation in a counter-current direction to a distillation pot for water removal. The distillation pot serves as a solvent reservoir for the system and can be controlled by adjusting the rate of water removal and distillation temperatures to provide a solvent having the desired water content. A water cooler can be placed on the solvent inlet line for adjustment of the solvent temperature to the desired value. This process has the advantage of providing a wide range of column conditions.

One embodiment of the equipment useful for the process comprises a column 70 inches in length and 3 inches in diameter with a conical bottom for collecting the settling microspheres. The solvent is pumped into the column 4 inches from the bottom and is removed from the column 4 inches from the top.

Choice of solvents for this system is very important. The solvents giving the best results are the higher alcohols which have the desired solubility for water. The solvents must be inert, free of objectionable physical properties such as emulsifying tendencies, for example, must have a density low enough to permit settling of the microspheres and must be capable of being heated to a temperature which is sufficiently high to cause decomposition of the ammonia-releasing agent to release ammonia in the aqueous droplets introduced into this system. The solvents selected must have saturation concentrations with water within a certain range permitting adjustment of drying conditions. Solubility for water of from about 1 to 30 percent has provided satisfactory results. Examples of preferred solvents include hexanol, ethyl-hexanol, and ethyl-butanol. Solvents with water solubilities which are too high may be recirculated from the distillation pot still retaining a predetermined amount of water whereby the effective water solubility is dimished. For example, butanol, which has a hot solubility for water of about 28 weight percent, is nearly saturated with water when introduced into the column. In contrast, ethyl-hexanol, which has a 4 to 6 weight percent hot solubility for water, is circulated to the column in nearly anhydrous form. Hexanol, with a 10 to 11 weight percent hot solubility for water is used with a water content of 3 to 6 percent.

The temperature of the dehydrating solvent entering the column generally ranges from about 60 to 120° C. while that leaving from the top of the column is generally from about 10 to 40° C. cooler. Such temperatures are ideal for releasing ammonia within the aqueous droplets with most of the ammonia-releasing agents. Higher solvent temperatures may be employed with ammonia releasing-agents such as urea.

The suspension droplets are dried to a final water content of less than 50 percent and preferably less than 25 percent in the column. The partially dehydrated product microspheres contain unreacted precipitating agent plus ammonium salts and other neutralization products. These must be removed prior to sintering. Therefore, the microspheres are treated with ammonia to fix the oxide components, then washed with water, and finally dreid by heating in a stream of inert gas or in a vacuum. Preferably, the microspheres are gradually heated from 40° C. up to 110° C. during drying. The resulting microspheres are then ready for sintering.

The process of this invention is a simple, direct process. Because the hydrolysis rates increase with temperature, the ammonia-releasing agent may be dissolved in the metal oxide aquasol and/or metal salt solution feed at room temperature where the hydrolysis rate is slow and will not cause precipitation. When the feed containing the precipitation agent is exposed to the higher temperatures of the dehydrating solvent, the rate of ammonia release is vastly accelerated and the hydrous oxide is precipitated and gelled within the droplet. The dehydrating solvent gradually extracts water from the precipitated droplets until substantially dry microspheres are obtained.

The compositions of this invention are microspheroidal particles having the composition, in terms of weight percents, of from 30 to 55 percent uranium dioxide, 10 to 45 percent yttrium oxide, and 15 to 55 percent zirconium dioxide, the components being in solid solution or intimate mixture. These concentrations are critical in forming a unique, sintered microsphere material having special nuclear fuel characteristics. Fuel elements fabricated from microspheres having this composition exhibit an exceptional stability and strength. Microspheres having the composition, in terms of weight percents, of 45 percent uranium dioxide, 35.6 percent yttrium oxide, and 19.4 percent zirconium dioxide are of particular interest in this respect. The product has a particle size of from 50 to 400 microns, and comprises perfect spheres having smooth surfaces and being free from defects such as craters and blow holes. In this composition, the uranium dioxide component exhibits unusual stability against oxidation when used as a fuel. Therefore, fuel elements fabricated from the microspheres of this invention exhibit improved structural stability in use. The green (unsintered) microspheres of this invention have densities of from 15 to 60 percent and preferably from 25 to 50 percent of theoretical density. The theoretical density (calculated value) for the composition of this invention range $Y_2O_3$–15% $ZrO_2$, to 7.68 g./cc. for the composition, 55% $UO_2$–10% $Y_2O_3$–35% $ZrO_2$. The sintered microspheres have densities ranging up to 99% of theoretical density.

This invention is further illustrated by the following specific but non-limiting examples.

EXAMPLE I

This example illustrates the preparation of microspheres having the composition 45% $UO_2$–36.6 $ZrO_2$–19.4% $Y_2O_3$ from a feed which is a ternary mixture of the respective chlorides and to which hexamethylenetetramine has been added just prior to dehydration.

A ternary solution was obtained by mixing 214 ml. of uranous chloride solution containing the equivalent of 94.8 g. $UO_2$ per liter, 43.5 ml. of a zirconyl chloride solution containing the equivalent of 200 g. $ZrO_2$ per liter, and 80 ml. of a yttrium chloride solution containing the equivalent of 200 g. $Y_2O_3$ per liter. To this solution a 45.9 g. quantity of hexamethylenetetramine crystals dissolved in 57 ml. of deionized water was added with strong stirring. The addition of the hexamethylenetetramine brought the pH of the feed to 1.4.

Droplets were formed by injecting the feed through a 23-gauge hypodermic needle surrounded by 2.8 mm. capillary tube through which a concurrent flow of hexanol was maintained. The droplets then entered the top of a 7 ft. column through which hexanol was pumped countercurrently. Conditions in the equipment were as follows:

| | |
|---|---:|
| Sol injection rate, ml./min. | 2.8 |
| Solvent flow rate, ml./min.: | |
|     To needle | 120 |
|     To column | 690 |
| Solvent temperature, ° C.: | |
|     To needle | 30 |
|     To column | 100 |
|     From column | 72 |
|     In distillation pot | 108 |

Perfect black microspheres with smooth, shiny surfaces were recovered from the column. The size of the microspheres ranged from 70 to 300 microns. The spheres were soaked in a concentrated ammonia solution for 15 min. to fix the oxide components, and then washed in water to remove electrolytes. The microspheres were then dried on a filter and then placed in a vacuum oven. The temperature of the oven was raised gradually over a 7.5 hour period to a high of 120° C.

The microspheres have a density 48% of the theoretical density (6.66 g./cc.) as measured by the mercury displacement method.

EXAMPLE II

This example describes the preparation of microspheres having the same composition as in Example I but obtained from a ternary sol rather than from a solution.

A reactive uranium dioxide-zirconium dioxide sol was obtained by electrodialyzing a uranyl-zirconyl chloride solution. The ternary sol was obtained by autoclaving the uranium dioxide-zirconium dioxide sol with an yttrium oxide sol. To a 200 ml. portion of this sol was added, with strong stirring, a 20 ml. volume of hexamethylenetetramine solution containing 5 g. of hexamethylenetetramine. The addition of the hexamethylenetetramine raised the pH from 6.2 to 6.7.

The hexamethylenetetramine-treated sol was delivered to the column described in Example I under the following conditions:

Sol injection rate, ml./min. _____ 4.0
Solvent flow rate, ml./min.:
    To needle _____ 85
    To column _____ 690
Solvent temperature, ° C.:
    To needle _____ 28
    To column _____ 100
    From column _____ 73
    In distillation pot _____ 110

Black microspheres which ranged from 150 to 230 microns in diameter were recovered from the bottom of the column. These were soaked for 15 min. in a concentrated ammonia solution and then washed and dried as described in Example I.

Obviously, many modifications and variations of the process of this invention as herein set forth may be made without departing from the essence thereof, and only such limitations should be applied as are indicated in the claim.

What is claimed is:

1. Microspheroidal uranium dioxide-yttrium oxide-zirconium dioxide particles having a size of from 50 to 400 microns and consisting essentially of from 30 to 55 weight percent uranium dioxide, 10 to 45 weight percent yttrium oxide, and 15 to 55 weight percent zirconium dioxide.

References Cited

UNITED STATES PATENTS

| | | | |
|---|---|---|---|
| 3,148,151 | 9/1964 | Fitch et al. | 252—301.1 |
| 3,150,100 | 9/1964 | Fitch et al. | 252—301.1 |
| 3,171,715 | 3/1965 | Kleinsteuber | 252—301.1 X |
| 3,235,326 | 2/1966 | Slooten | 264—0.5 X |
| 3,312,631 | 4/1967 | Smith | 252—301.1 |
| 3,312,632 | 4/1967 | Smith | 252—301.1 |
| 3,329,623 | 7/1967 | Fitch et al. | 252—301.1 |
| 3,340,567 | 9/1967 | Flack et al. | 252—301.1 |
| 3,345,437 | 10/1967 | Flack et al. | 252—301.1 X |
| 3,355,525 | 11/1967 | Smith et al. | 252—301.1 X |

OTHER REFERENCES

Nuclear Science Abstracts, vol. 19, No. 20, Oct. 31, 1965, Abstract No. 39,094.

BENJAMIN R. PADGETT, Primary Examiner

M. J. SCOLIUCK, Assistant Examiner

U.S. Cl. X.R.

176—89